US007501926B2

(12) United States Patent
Watchorn et al.

(10) Patent No.: US 7,501,926 B2
(45) Date of Patent: Mar. 10, 2009

(54) HEAT SENSING ELECTRICAL RECEPTACLE

(75) Inventors: Douglas Watchorn, Frenchtown, NJ (US); Barry Littlewood, Harmony, NJ (US); Robert Z. Kopelman, Rockville Centre, NY (US)

(73) Assignee: B Safe Electrix, Inc., Manhasset, NY (US)

( * ) Notice: Subject to any disclaimer, the term of this patent is extended or adjusted under 35 U.S.C. 154(b) by 252 days.

(21) Appl. No.: 11/088,374

(22) Filed: Mar. 24, 2005

(65) Prior Publication Data

US 2005/0212646 A1 Sep. 29, 2005

Related U.S. Application Data

(60) Provisional application No. 60/556,195, filed on Mar. 25, 2004.

(51) Int. Cl.
*H01H 61/00* (2006.01)
*H01H 61/01* (2006.01)
*H01H 71/14* (2006.01)
*H01H 79/00* (2006.01)
*H02H 9/08* (2006.01)

(52) U.S. Cl. .............................. 337/36; 337/16; 337/91; 337/113; 361/42

(58) Field of Classification Search ................... 337/16, 337/36–39, 380, 91, 113; 361/42
See application file for complete search history.

(56) References Cited

U.S. PATENT DOCUMENTS 2,789,255 A * 4/1957 Mekler ........................ 361/49
3,169,239 A * 2/1965 Lacey ......................... 340/638
3,539,867 A * 11/1970 Edmunds ..................... 361/45
3,737,606 A * 6/1973 Becker ....................... 200/520
3,781,857 A * 12/1973 Stendig et al. .............. 340/521
3,913,046 A * 10/1975 Davis et al. .................... 337/13
4,570,145 A * 2/1986 Carey ......................... 337/113
4,951,025 A * 8/1990 Finnegan et al. ............ 337/113
5,526,225 A * 6/1996 Wang ......................... 361/643
5,590,010 A * 12/1996 Ceola et al. ................ 361/93.4
5,594,398 A * 1/1997 Marcou et al. ................ 335/18
5,854,585 A * 12/1998 Kingma ...................... 337/367
5,861,794 A * 1/1999 Pellon ........................ 337/365
5,933,063 A * 8/1999 Keung et al. .................. 335/18
6,040,967 A * 3/2000 DiSalvo ....................... 361/42
6,084,193 A * 7/2000 Pellon ........................ 218/117
6,166,618 A 12/2000 Robertson
6,262,871 B1 * 7/2001 Nemir et al. .................. 361/42
6,282,070 B1 * 8/2001 Ziegler et al. ................. 361/42
6,288,882 B1 * 9/2001 DiSalvo et al. ................ 361/42
6,377,158 B1 * 4/2002 Yu ............................. 337/37
6,433,555 B1 * 8/2002 Leopold et al. ............. 324/509
6,477,021 B1 * 11/2002 Haun et al. ................... 361/42
6,734,769 B1 * 5/2004 Germain et al. ................ 335/6
6,788,173 B2 * 9/2004 Germain et al. ............... 335/18
6,979,787 B2 * 12/2005 Davies ..................... 200/51 R
2004/0100354 A1 * 5/2004 Davis et al. ................. 337/356
2004/0140117 A1 * 7/2004 Kim et al. ..................... 174/53

(Continued)

*Primary Examiner*—Jayprakash N Gandhi
*Assistant Examiner*—Bradley H Thomas
(74) *Attorney, Agent, or Firm*—Brenda Pomerance

(57) ABSTRACT

An electrical receptacle has an outlet and senses the operating temperature and automatically turns off when the temperature rises above a predetermined threshold. The receptacle has a reset button that must be manually operated to enable operation of the outlet to resume.

6 Claims, 8 Drawing Sheets

U.S. PATENT DOCUMENTS

| | | | | |
|---|---|---|---|---|
| 2004/0212466 | A1* | 10/2004 | Germain et al. | 335/18 |
| 2005/0105228 | A1* | 5/2005 | Kim et al. | 361/85 |
| 2005/0162789 | A1* | 7/2005 | Germain et al. | 361/42 |
| 2005/0236557 | A1* | 10/2005 | Hurst | 250/214 R |

* cited by examiner

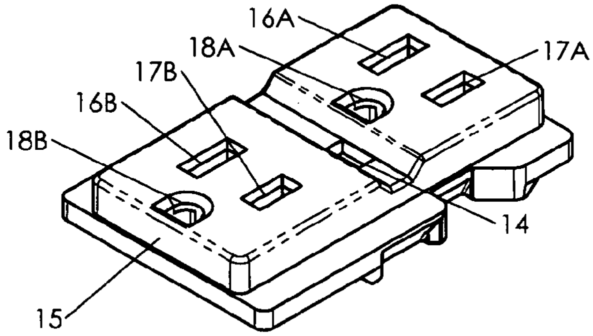
FIG. 4A
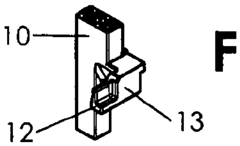
FIG. 4B
FIG.4D
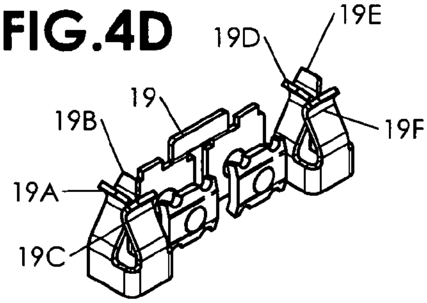
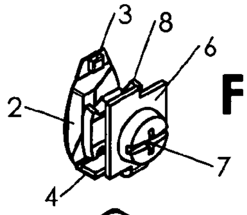
FIG. 4C
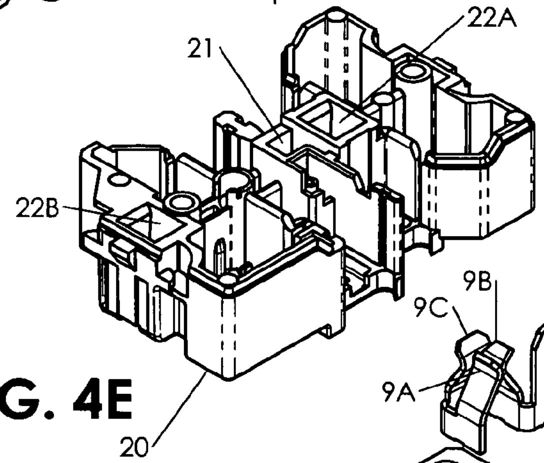
FIG. 4E
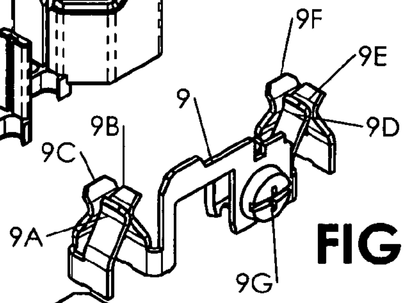
FIG.4F
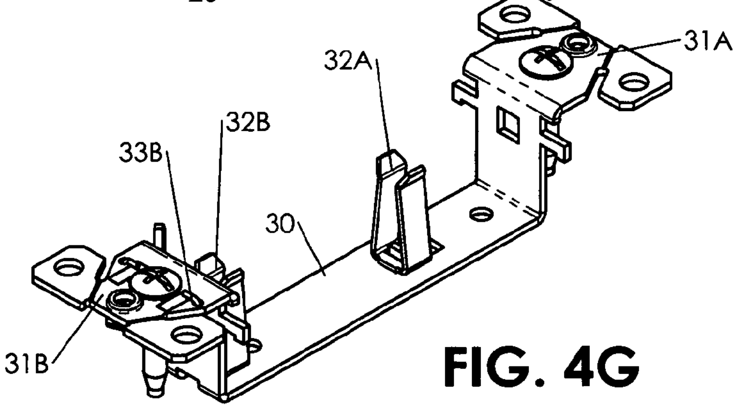
FIG. 4G

HEAT SENSING ELECTRICAL RECEPTACLE

This application claims priority from U.S. provisional patent application Ser. No. 60/556,195, HEAT SENSING ELECTRICAL RECEPTACLE, filed Mar. 25, 2004.

BACKGROUND OF THE INVENTION

The present invention relates to a receptacle having at least one electrical outlet, and more particularly, is directed to an electrical outlet that senses the ambient temperature, the receptacle temperature and the temperature of a prong of an electrical plug inserted into the outlet, and that automatically shuts off when any of these temperatures is too hot, and has a reset button for resuming operation.

Many fires are believed to be caused by overloaded electrical outlets, that is, outlets operated with more power transfer than the outlet was designed for. Fires are sometimes caused by a loose connection, a glowing connection and/or a high resistance path. A glowing connection occurs when copper oxide is formed between a copper wire and a steel screw in a small air gap creating carbon which glows.

The condition of too much power usage is always accompanied by increased temperature in at least one of the ambient temperature, the receptacle temperature and the temperature of a prong of an electrical plug inserted into the receptacle, collectively referred to herein as "operating temperature". To avoid fires, it is desirable for the outlet to sense when the operating temperature is too hot, and to cease operation.

Bimetallic switches are electromechanical thermal sensors. The bimetallic or bi-metal portion consists of two different metals bonded together such as brass and Invar. The metals expand at different rates as they warm, causing the element to twist or curve. The changing geometry is used to make or break an electrical contact. Once temperature has returned to normal levels, they revert back to their original geometry.

For a bi-metal comprising brass and invar, the bending occurs at a metal temperature of about 200° F.; the actual temperature threshold is determined by the design of the bimetal and its materials. The metal can be heated by a loose connection or by ambient air temperature. Typical plastic household wiring insulation and outlet housing melts at a temperature of about 300° F. but operation above 200° F. is not recommended due to its high probability of material distortion.

U.S. Pat. No. 6,166,618 (Robertson) discloses an outlet having a bimetallic dome that interrupts electrical contact when the temperature rises above a predetermined threshold. FIGS. 9 and 10 of the Robertson patent are reproduced as FIGS. 9 and 10 hereof. FIG. 9 shows electrical contacts 76*c*, 66*c*. At the bottom of FIG. 9, bimetallic dome 106 is shown in its reset (conducting) state. As the temperature rises above the operating threshold of bimetallic dome 106, it flips from a convex to a concave form. At the top of FIG. 9, there is a bimetallic dome in its tripped (non-conducting state), wherein the section of electrical contact 76*c* is electrically disconnected from contact member 66*c*. When the bimetallic dome changes shape, it pushes dielectric rod 110 outwards through hole 108, as shown in FIG. 10. Dielectric rod 110 can be manually depressed to reset the bimetallic dome.

The Robertson configuration has several drawbacks. First, a bimetallic dome is associated with each of the outlets in a duplex receptacle, increasing the cost of the receptacle. Second, the dielectric rod is positioned such that the faceplate of the receptacle must be removed to access the dielectric rod, which is inconvenient. Also, the location of the dielectric rod makes it impossible to quickly see that it has tripped. Third, as the bimetallic dome cools below its operating threshold, it can reset itself back to its original configuration. This automatic resetting can be dangerous to a person working around the outlet; in particular, a worker can be electrocuted by the sudden resumption of current. Fourth, although one outlet of a duplex outlet may be tripped, the other outlet will continue functioning, implying to a casual observer that the first outlet is dead rather than tripped, which could result in worker electrocution.

The Robertson patent also discloses another embodiment, shown in FIG. 11, having dish-shaped bimetallic portions 80 that resets on their own as the operating temperature cools. A reset button is absent.

Thus, there is a need for an outlet that is sensitive to heat and avoids undesirable operation.

SUMMARY OF THE INVENTION

In accordance with the present invention, there is provided an electrical receptacle comprising a line terminal having a first contact and a bimetallic dish, a feed terminal having a second contact, and a reset button having an arm and an internal spring. In a normal reset state, the bimetallic dish bends inward so that the first and second contacts touch. In a tripped state, the bimetallic dish bends outward enabling the internal spring to push the arm of the reset button between the first and second contacts, thereby preventing the first contact from touching the second contact even if the bimetallic dish bends inward again.

It is not intended that the invention be summarized here in its entirety. Rather, further features, aspects and advantages of the invention are set forth in or are apparent from the following description and drawings.

BRIEF DESCRIPTION OF THE DRAWINGS

FIGS. 4A-4G are three-dimensional views of subassemblies of the electrical receptacle package shown in FIG. 1;

DETAILED DESCRIPTION

An electrical receptacle has an outlet and senses the operating temperature and automatically turns off when the temperature rises above a predetermined threshold. The receptacle has a reset button that must be manually operated to enable operation of the outlet to resume.

Figure 1:
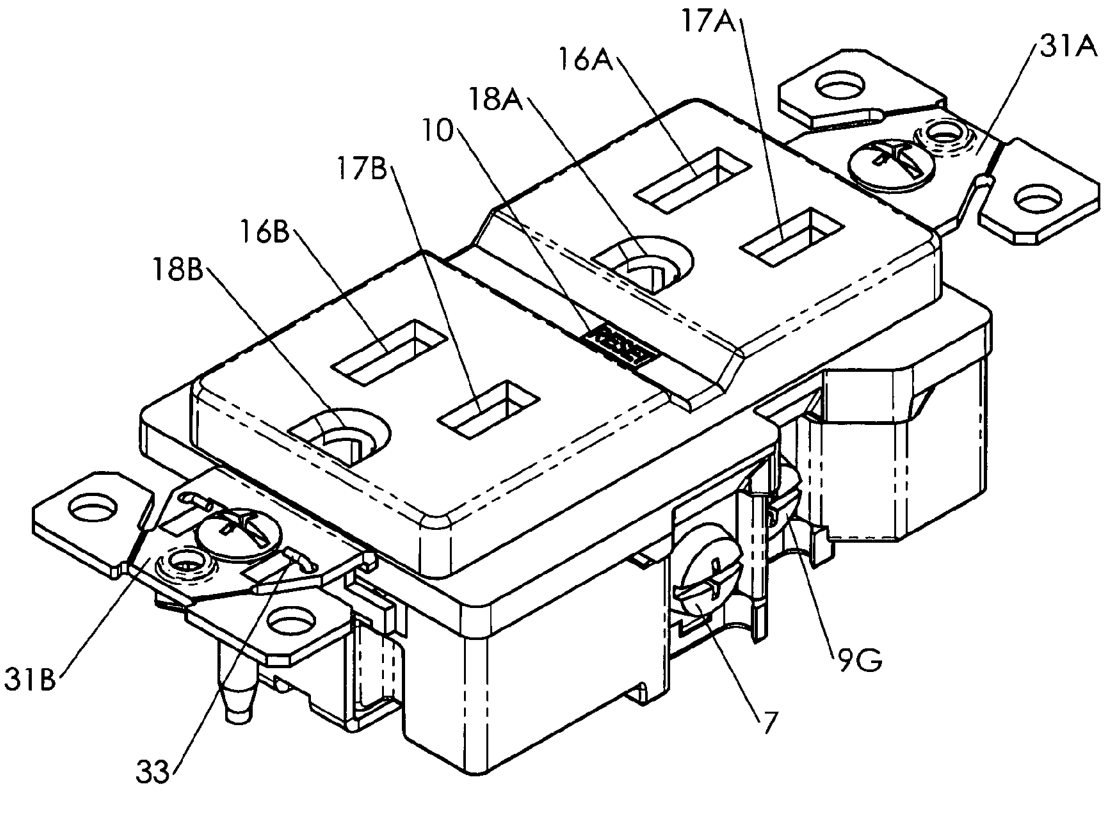
FIG. 1 is a three-dimensional view of the electrical receptacle package.

FIG. 1 is a three-dimensional view of the electrical receptacle package of the present invention. The receptacle has a top outlet and a bottom outlet. Each outlet is adapted to receive a 3-prong plug comprising a neutral (N) terminal, a load (L) terminal and a ground terminal for receiving the blades of an electrical plug, or a 2-prong plug comprising a neutral terminal and a load terminal. Specifically, the top outlet has neutral slot 16A, live slot 17A and ground slot 18A, while the bottom outlet has neutral slot 16B, live slot 17B and ground slot 18B. Screw 7 indicates the line terminal, screw 9G indicates the feed terminal, a screw (not shown) on the occluded side of the receptacle indicates the neutral terminal, and mounting tabs 31A, 31B are provided. Typically, electrical receptacles are connected in parallel via the household wiring. Generally, the line terminal serially couples to a thermal interrupt which serially couples to the feed (load) terminal.

Reset button 10 is located between the top outlet and the bottom outlet. During normal operation, the top of reset button 10 is approximately flush with the receptacle packaging. A thermal interrupt, discussed below, is located between the line terminal of the receptacle and the live terminals of the outlets. The thermal interrupt functions to interrupt the contact between the household wiring and the portion of the receptacle in contact with the blades of the electrical plug inserted into the top outlet or the bottom outlet. The thermal interrupt also prevents power from reaching any downstream outlets connected via the household wiring; downstream outlets are assumed to be on the feed (load) side. When the thermal interrupt triggers, reset button 10 pops outward. Manually depressing reset button 10, when the temperature is sufficiently cool, returns the reset button to its flush configuration and the thermal interrupt to its reset condition.

The receptacle package shown in FIG. 1 is approximately the same size as a standard two-outlet electrical receptacle having dimensions 2.64×1.33 inches, with a depth of 1.1 inches.

Figure 2:
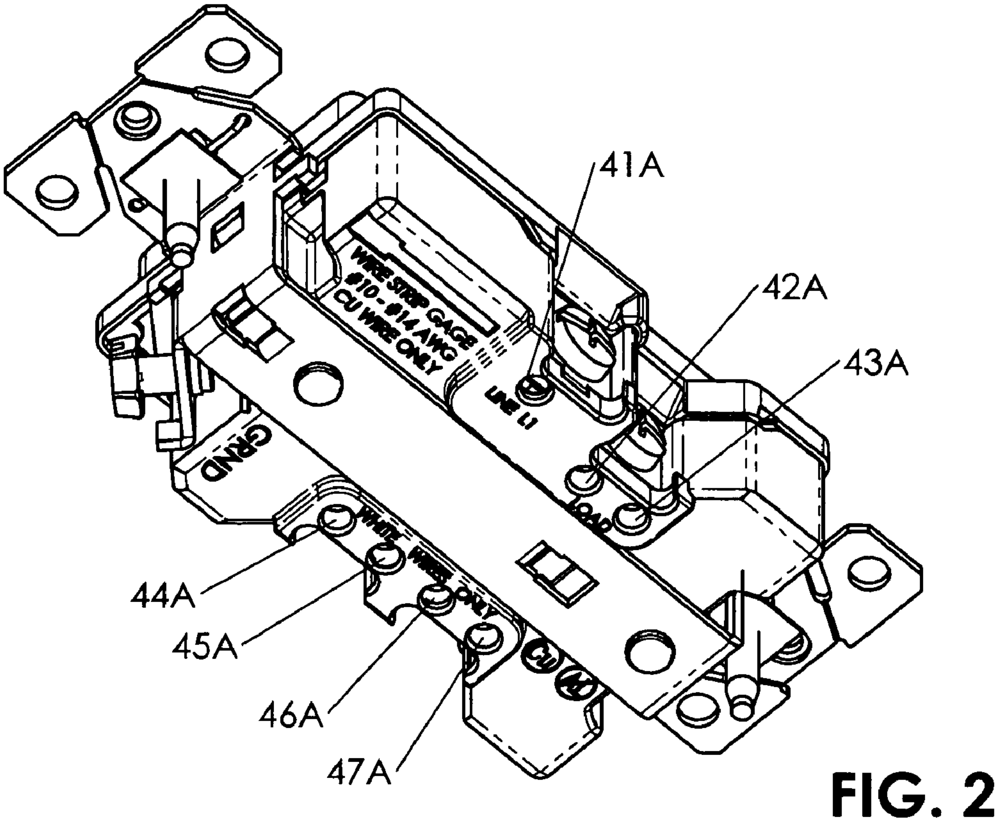
FIGS. 2 and 3 are three-dimensional views of the underside of the electrical receptacle package shown in FIG. 1 showing different types of wire connections.
Figure 3:
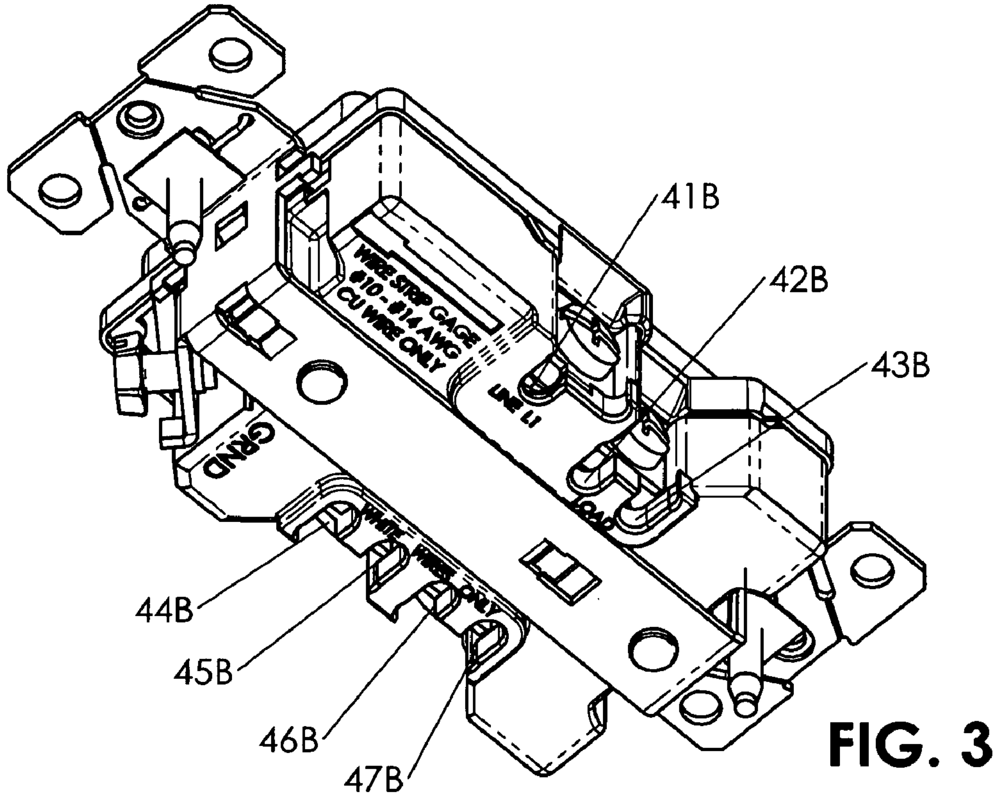

FIGS. 2 and 3 are three-dimensional views of the underside of the electrical receptacle package shown in FIG. 1 showing different types of wire connections. Generally, wires can be coupled to receptacles via the side-wire method, in which wire is wrapped under a screwhead, the back-wire method, in which wire is inserted from behind through a hole or slot and clamped under a clamping plate as the screw is tightened, or the push-wire method, in which a wire is simply pushed into a terminal and clamped by a spring-loaded brass member inside the terminal. The push-wire method causes many loose connections, and is not favored for this reason. FIG. 2 shows a back-wire configuration with holes 41A-47A; FIG. 3 shows a back-wire configuration with slots 41B-47B.

FIGS. 4A-4G are three-dimensional views of subassemblies of the electrical receptacle package shown in FIG. 1.

FIG. 4A shows cover 15 having neutral slots 16A, 16B, live slots 17A, 17B, ground slots 18A, 18B, and hole 14 for reset button 10.

FIG. 4B shows reset button 10 having contact arm 12 and extension 13. Reset button 10 has an internal spring located at its base, best seen in FIGS. 6A and 6B. Reset button 10 has a columnar body with a rectangular cross-section and a button surface atop the columnar body. Extension 13 is located on one side of the columnar body at approximately above mid-column height. Contact arm 12 is at the distal end of extension 13. The columnar body of reset button 10 has a cavity at its base for receiving internal spring 11.

Figure 7:
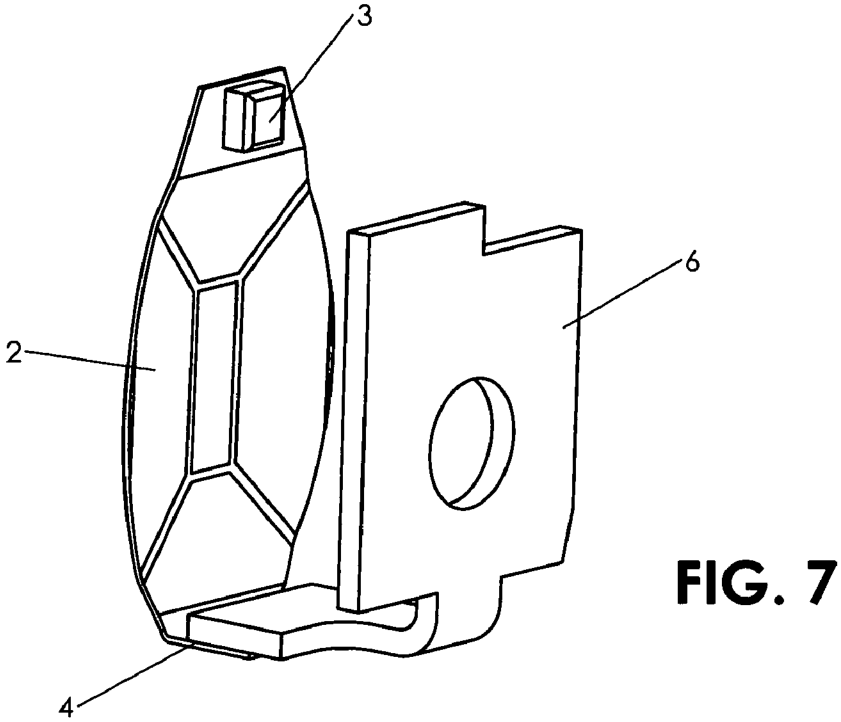
FIG. 7 is a three-dimensional view of the bi-metal portion of the thermal interrupt mechanism.

FIG. 4C shows the bimetallic line terminal subassembly. As shown in FIG. 7, bimetallic dish 2 has base 4 and silver contact 3 fastened to its top, such as by spot welding. Practically, the silver contact is usually a silver coating on a nickel backing. Instead of silver, any other conductive substance may be used, such as gold. Base 4 is fastened to line terminal 6 such as by spot welding. Returning to FIG. 4C, screw 7 passes through line terminal 6 and is threaded into clamping plate 8.

The prior art bimetallic device is dome-shaped, to ensure that when the device trips, the dielectric rod is pushed from a recessed position to a projecting position; that is, the height of the dome should be relatively large as the height difference has a mechanical purpose. In contrast, the present invention can use a shallow dish-shaped bimetallic device as the reset button is moved by its internal spring, not by the flexing of the bimetallic device.

FIG. 4D shows neutral terminal subassembly 19 having a left triple wipe basket with prongs 19A, 19B, 19C and a right triple wipe basket with prongs 19D, 19E, 19F. The triple wipe baskets are configured for a 15 amp, 120 volt plug, but in other embodiments also accommodate a 15 amp, 240 volt plug; a 20 amp, 120 volt plug; or a 20 amp, 240 volt plug.

In the United States, a 240 volt plug has two hot legs each having 120 volts. In Europe, a 240 volt plug has one neutral leg and one hot leg having 240 volts. Accordingly, for a United States 240 volt plug, a single bimetal thermal interrupt must be configured to open the contacts corresponding to both of the hot legs, or a bimetal thermal interrupt must be associated with each of the hot legs.

FIG. 4E shows plastic base 20 having reset button compartment 21 and ground terminal holes 22A, 22B. Neutral terminal subassembly 19 fits into the left side of plastic base 20, while feed terminal subassembly 9 fits into the right side of plastic base 20.

Figure 8:
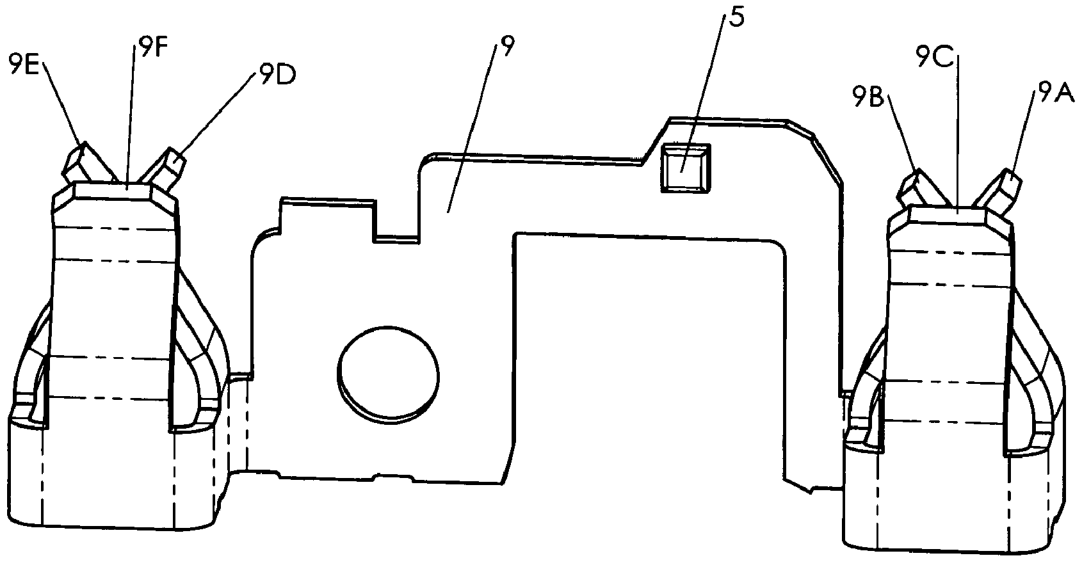
FIG. 8 is a three-dimensional view of the contact portion of the thermal interrupt mechanism.
Figure 9:
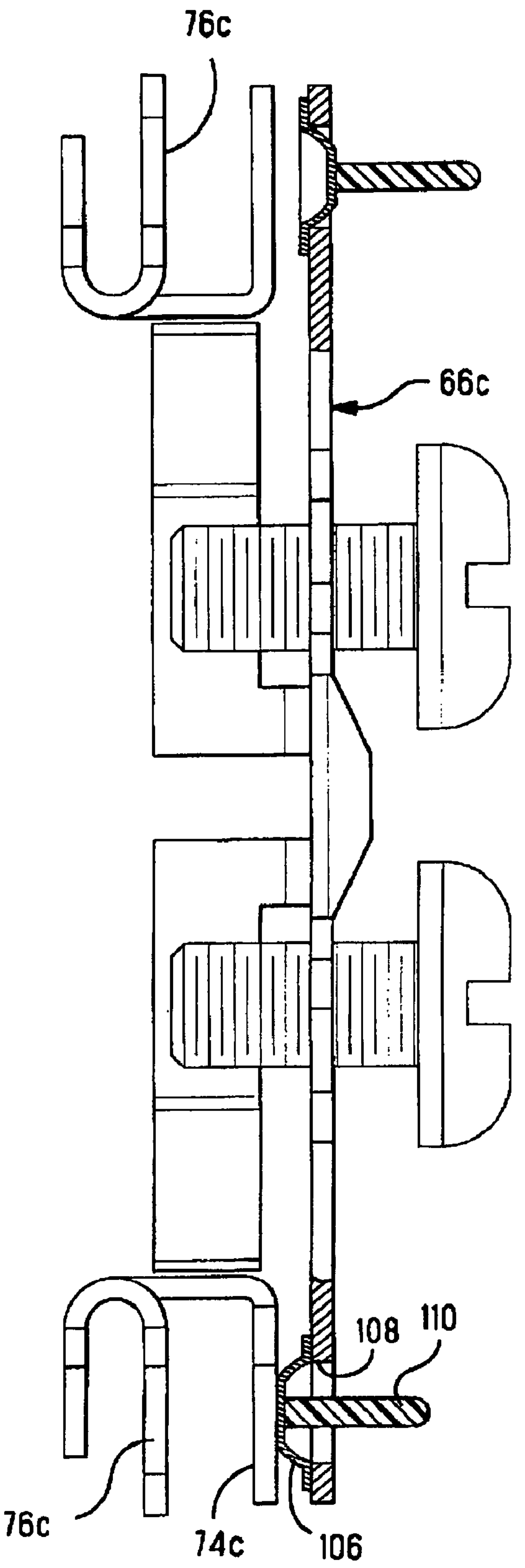
FIG. 9 (PRIOR ART)
FIGS. 9 and 10 are views of a prior art electrical safety receptacle.
Figure 10:
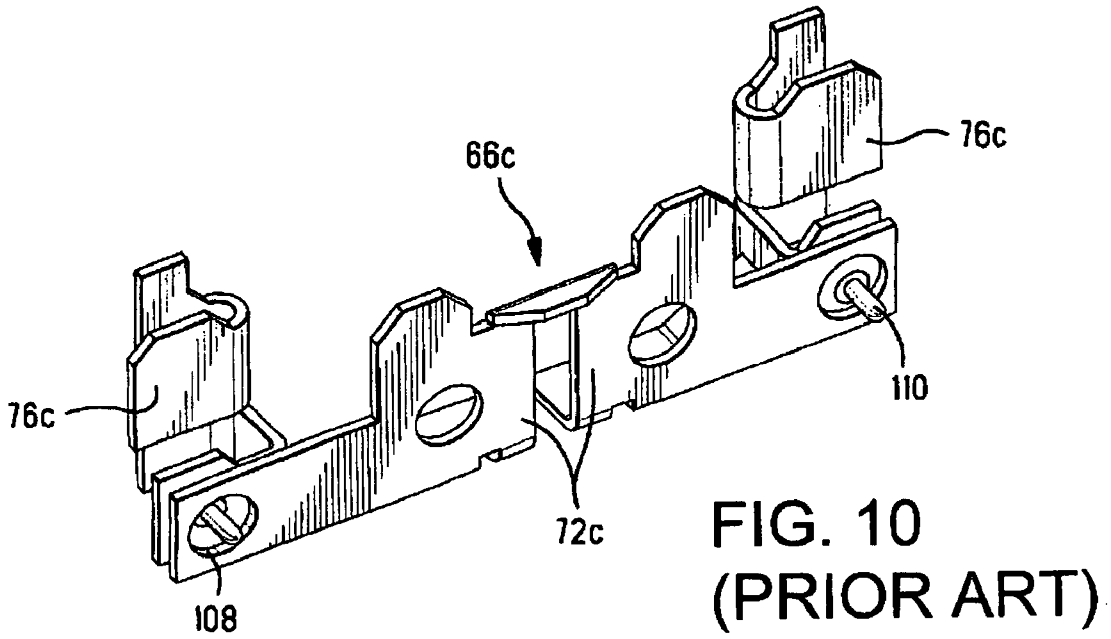
FIG. 10 (PRIOR ART)
Figure 11:
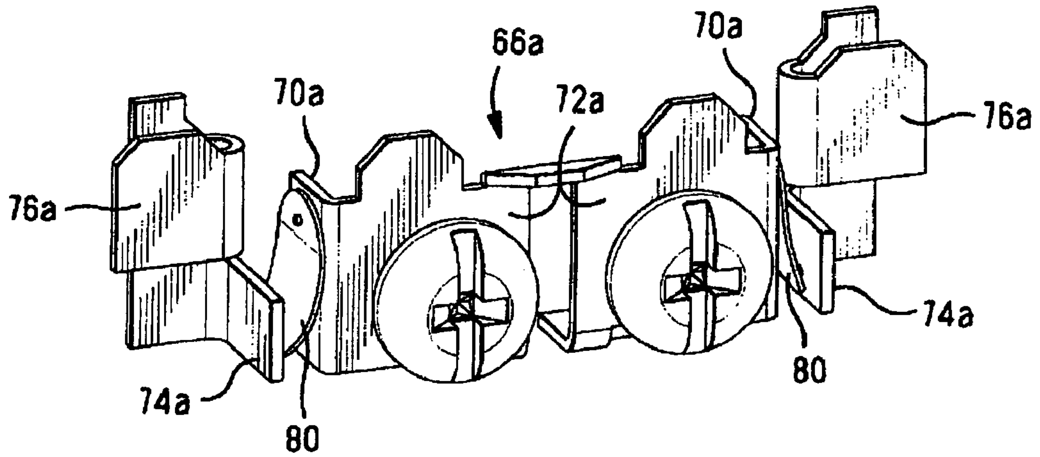
FIG. 11 (PRIOR ART)
FIG. 11 is a view of another prior art electrical safety receptacle.

FIG. 4F shows feed terminal subassembly 9 having a left triple wipe basket with prongs 9A, 9B, 9C and a right triple wipe basket with prongs 9D, 9E, 9F. Feed terminal subassembly 9 also has screw 9G inserted therein. As shown in FIG. 8, silver contact 5 is spot welded on feed terminal subassembly 9.

FIG. 4G shows grounding strap subassembly 30 having mounting tabs 31A, 31B and ground prongs 32A, 32B. After the screws in mounting tabs 31A, 31B are tightened, grounding wire 33B serves to electrically connect grounding strap subassembly 30 to a metal box (not shown) placed in the wall.

The neutral, live and ground blades of a three-prong plug are inserted through slots 16A, 17A, 18A of FIG. 4A. The neutral blade then rests in right triple wipe basket having prongs 19D, 19E, 19F of FIG. 4D, while the live blade then rests in right triple wipe basket having prongs 9D, 9E, 9F of FIG. 4F. The ground blade passes through ground terminal hole 22A of base 20 of FIG. 4E and thence to ground prongs 32A of ground strap 30 of FIG. 4G.

Figure 5A:
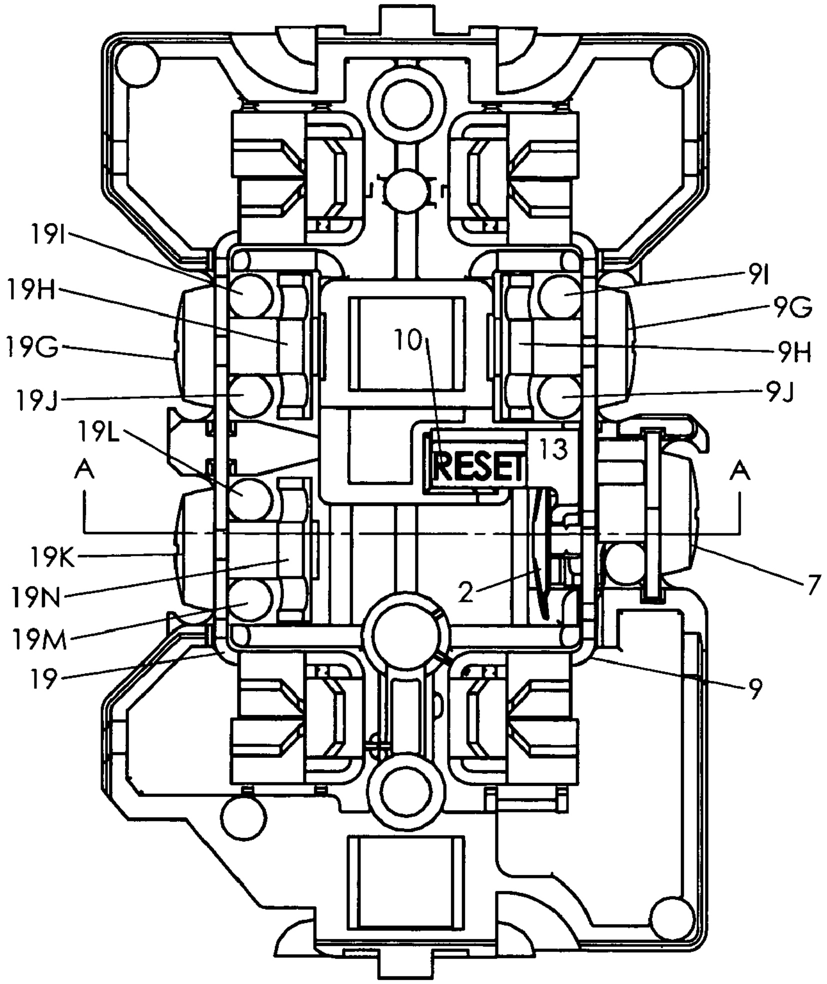
FIG. 5A is a top-down view of the electrical receptacle with its outer package removed.

FIG. 5A is a top-down view of the electrical receptacle with its outer package removed. At the left, neutral subassembly 19 includes screws 19G, 19K, clamping plates 19H, 19N, and holes for neutral wire 191, 19J, 19L, 19M. A similar configuration exists at the right for feed subassembly 9. Part of feed subassembly 9 is occluded by the bimetal subassembly and reset button, which are better viewed in FIG. 5B.

Figure 5B:
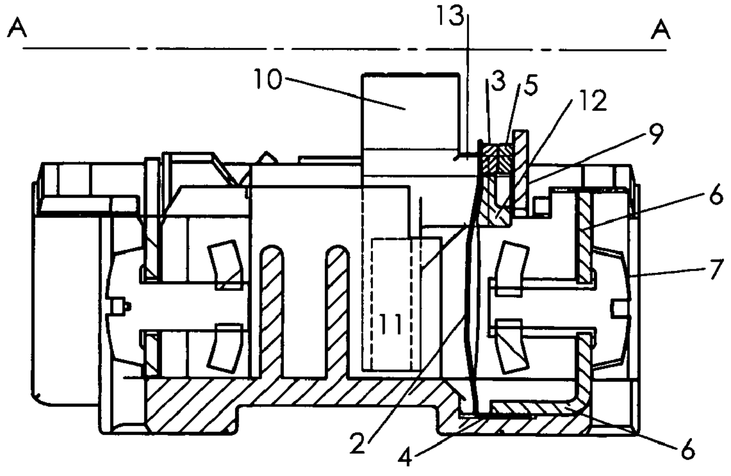
FIG. 5B is a depth view across reference line AA in FIG. 5A.

FIG. 5B is a depth view across reference line AA in FIG. 5A. Reset button 10 has spring 11 at its interior base, extension 13 and contact arm 12. Bimetallic dish 2 has base 4 and silver contact 3 fastened to its top. Base 4 is fastened to line terminal 6. Silver contact 5 opposes silver contact 3; silver contact 5 is welded to feed terminal 9. Screw 7 is inserted through a hole in line terminal 6 and fastened with clamping plate 8.

Figure 6A:
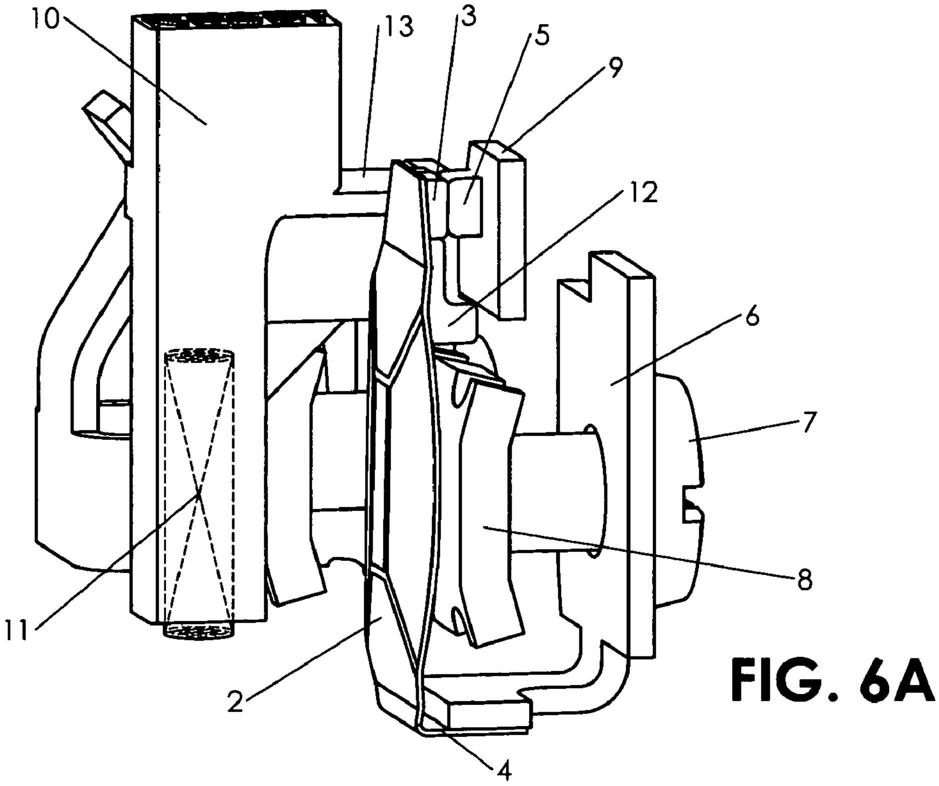
FIG. 6A is a three-dimensional view of the thermal interrupt in its reset state.

FIG. 6A is a three-dimensional view of the thermal interrupt in its reset state, that is, its normally closed state. Arm 12 of reset button 10 is seen to be below contacts 3 and 5 that are in contact with each other. At a normal operating temperature, bimetallic dish 2 bends inwards, resisting the tendency of arm 12 to move upwards. As the ambient temperature increases, bimetallic dish 2 bends so as to move contact 3 away from contact 5, allowing spring 11 of reset button 10 to push upwards between silver contacts 3, 5, thus interrupting power flow.

Figure 6B:
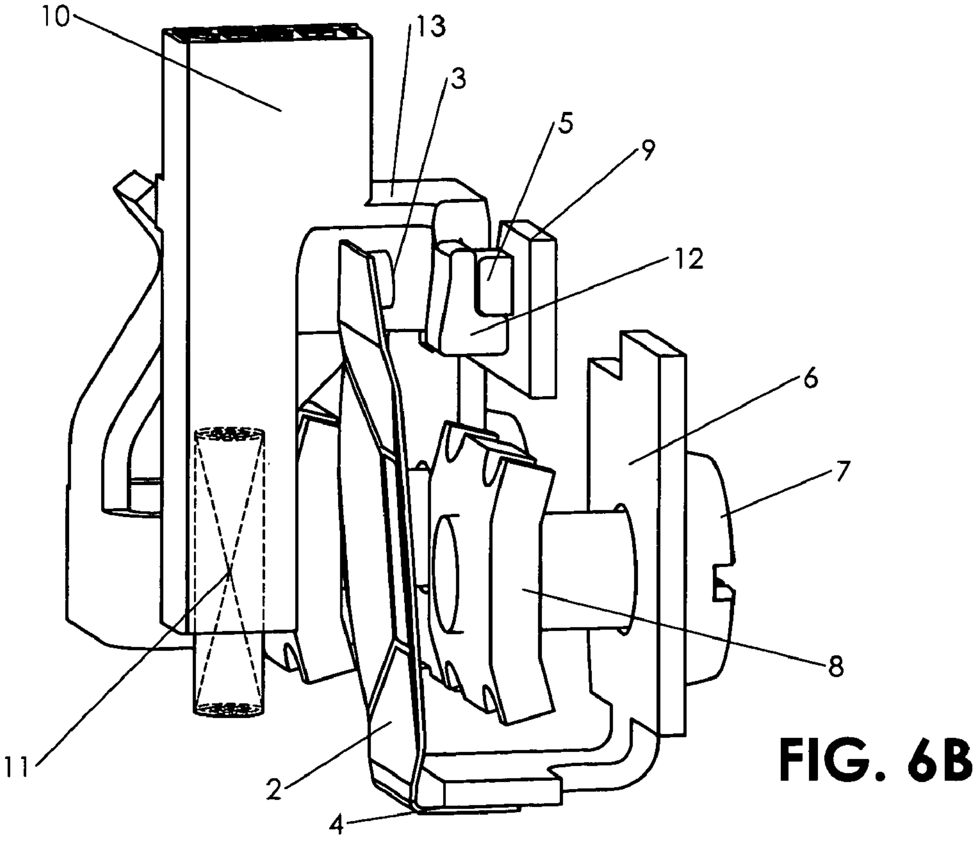
FIG. 6B is a three-dimensional view of the thermal interrupt in its tripped state.

FIG. 6B is a three-dimensional view of the thermal interrupt in its tripped state. Reset button 10 is elevated such that arm 12 abuts against contact 5. The body of arm 12 prevents contact 3 from touching contact 5 even if bimetallic dish 2 tries to change shape on its own, such as after the temperature cools. Reset button 10 must be manually depressed to return the electrical receptacle to its reset state. If the temperature is too high, bimetallic dish 2 will still bend away from contact 5 so that power conduction will not occur. When the temperature has cooled sufficiently, then resetting can occur.

The present invention has various advantages. There is only one bimetallic device per duplex receptacle, reducing the cost of thermal overload protection. The reset button is readily accessible, making it easy to see when the device has tripped and convenient to reset the device. The device cannot automatically reset under any circumstances, that is, under all circumstances, manual action must occur to reset the device.

The present invention has been described with respect to a duplex receptacle. In another embodiment, the present invention is applied in a wall adapter outlet. Specifically, a portable unit having duplex outlets with thermal interrupt protection is plugged into a wall receptacle having duplex outlets lacking thermal interrupt protection.

In yet another embodiment, the present invention is applied in a power strip comprising a plurality of receptacles, the power strip being plugged into a standard outlet. The power strip has one bimetallic subassembly for all of its receptacles. If the power strip is long, a sensor and relay are provided so that the bimetallic subassembly can react to operating temperatures throughout the power strip.

Most households include ground fault interrupt (GFI) electrical receptacles in areas that are moist, such as bathrooms. A ground fault is an unintended leakage of current to ground, possibly through a person. The regular grounding system protects the equipment that is attached (or plugged in) to the circuit against a ground fault in it. GFI devices are designed to protect people, not equipment.

A GFI receptacle shuts down the protected electric circuit—opens it—when it senses an unexpected loss of power, to ground. GFI protection devices constantly monitor and compare the amount of power flowing from the panel on the hot or phase wire and the amount returning on the neutral wire. Any time the current on the hot leg and the neutral leg are unequal, the protection device will trip and open the circuit. GFI devices work by passing both the hot wire and the neutral wire through a sensor such as a differential transformer and connecting the sensor to a solenoid or relay that opens switch contacts built into the power conductors inside the device—in front of the transformer. When it is working properly, a GFI device will open its protected circuit when the difference between the current coming in and the current going out reaches 0.005 ampere.

A GFI receptacle typically has a reset button. Due to its elaborate circuitry, a GFI receptacle is substantially more expensive than a regular receptacle.

The present temperature sensing features could be added to a GFI receptacle.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. An electrical receptacle, comprising:

a live terminal having a first contact attached to a bimetallic dish, a feed terminal having a second contact, and a reset button having a columnar body with a cavity at its base and a button surface at its top and an extension portion located on one side of the columnar body, the extension portion having an arm on its distal end, the reset button also having an internal spring located in the cavity, wherein, in a normal reset state, the bimetallic dish bends inward so that the first and second contacts touch and the reset button is in an untripped position and the arm is prevented from moving upwards by the first contact, and in a tripped state, the bimetallic dish bends outward enabling the internal spring to push upward the arm of the reset button between the first and second contacts so that the reset button is in a tripped position wherein the arm abuts the second contact, the presence of the arm between the first and second contacts preventing the first contact from touching the second contact even if the bimetallic dish bends inward again, and wherein manual depression of the button surface of the reset button returns the reset button to its untripped position.

2. The electrical receptacle of claim 1, further comprising a cover, and wherein the reset button is flush with the cover in the normal reset state, and the reset button protrudes from the cover in the tripped state.

3. The electrical receptacle of claim 1, wherein the bimetallic dish changes from bending inwards to bending outwards at a predetermined temperature.

4. The electrical receptacle of claim 1, wherein the bimetallic dish is shallow and not dome-shaped.

5. The electrical receptacle of claim 1, wherein the electrical receptacle has at least two outlets, and in the tripped state, power is prevented from flowing in all of the at least two outlets.

6. A method of interrupting operation of an electrical receptacle, comprising:

in a reset state, the electrical receptacle having a line terminal electrically connected to a first contact attached to a bimetallic dish, the bimetallic dish being in an initial orientation, and a feed terminal electrically connected to a second contact, the first and second contacts touching, in response to a temperature change, the bimetallic dish changing to a triggered orientation and moving the first contact apart from the second contact to be in a triggered state, the electrical receptacle having a reset button having a columnar body with a cavity at its base and a button surface at its top and an extension portion located on one side of the columnar body, the extension portion having on arm at its distal end, the reset button also having an internal spring located in the cavity, the arm pressing against the first contact in the reset state, wherein the separation of the first contact from the second contact by the changing of the bimetallic dish going to the triggered state enables the arm to be pressed upward by the internal spring so that the arm abuts the second contact and prevents the first contact from touching the second contact even if the bimetallic dish returns to its initial orientation.

* * * * *